US008532008B2

(12) United States Patent
Das et al.

(10) Patent No.: US 8,532,008 B2
(45) Date of Patent: Sep. 10, 2013

(54) SYSTEMS, DEVICES, AND METHODS OF MANAGING POWER CONSUMPTION IN WIRELESS SENSOR NETWORKS

(76) Inventors: Arnab Das, Bethesda, MD (US); Santanu Das, Monroe, CT (US)

( * ) Notice: Subject to any disclaimer, the term of this patent is extended or adjusted under 35 U.S.C. 154(b) by 67 days.

(21) Appl. No.: 13/342,955

(22) Filed: Jan. 3, 2012

(65) Prior Publication Data
US 2012/0201179 A1 Aug. 9, 2012

Related U.S. Application Data

(60) Provisional application No. 61/429,429, filed on Jan. 3, 2011.

(51) Int. Cl.
G08C 17/00 (2006.01)
G06F 15/173 (2006.01)
(52) U.S. Cl.
USPC ............................. 370/311; 709/238; 709/241
(58) Field of Classification Search
USPC ........................................................ 370/311
See application file for complete search history.

(56) References Cited

U.S. PATENT DOCUMENTS

| 6,310,883 | B1 * | 10/2001 | Mann et al. | 370/408 |
|---|---|---|---|---|
| 7,042,846 | B2 * | 5/2006 | Bauer | 370/238 |
| 7,159,035 | B2 * | 1/2007 | Garcia-Luna-Aceves et al. | 709/241 |
| 7,620,010 | B2 * | 11/2009 | Takeda et al. | 370/328 |
| 7,668,665 | B2 * | 2/2010 | Kim | 702/33 |
| 7,978,666 | B2 * | 7/2011 | Keshavarzian et al. | 370/338 |
| 8,175,016 | B1 * | 5/2012 | Basu et al. | 370/311 |

| 2003/0043756 | A1 * | 3/2003 | Reynders et al. | 370/254 |
|---|---|---|---|---|
| 2006/0203745 | A1 * | 9/2006 | Acharya et al. | 370/254 |
| 2008/0101244 | A1 * | 5/2008 | Liu et al. | 370/238 |
| 2010/0262576 | A1 * | 10/2010 | Stockwell et al. | 706/55 |

OTHER PUBLICATIONS

S. Sengupta, M. Chatterjee, K. Kwiat "A Game Theoretic Framework for Power Control in Wireless Sensor Networks," IEEE Trans. on Computers, Feb. 2010, p. 231-242,vol. 59, No. 2.
I. Akyildiz, W.Su, Y. Sankarasubramaniam, E. Cayirci, "A Survey on Sensor Networks," IEEE Comm. Mag., Aug. 2002, p. 102-114, vol. 40, No. 8.
J.Chang, L. Taussiulas, "Maximum Lifetime Routing in Wireless Sensor Networks," IEEE/ACM Transactions on Networking, Aug. 2004, vol. 12, No. 4.
W. Liu, Y. Zhang, W. Lou, "A Robust and Energy-Efficient Data Dissemination Framework for Wireless Sensor Networks," ACM Wireless Networks, Aug. 2006, vol. 12, No. 4.

(Continued)

Primary Examiner — Guang Li
(74) Attorney, Agent, or Firm — Atanu Das; Techlaw LLP

(57) ABSTRACT

Embodiments of the present disclosure include systems, methods, and devices for managing power consumption in a wireless sensor network. Such embodiments may include a remote server, a wide area network coupled to the remote server, at least one access point device coupled to the remote server through the wide area network, one or more sensors coupled to each other and to the access point and datasinks through the network. Each datasink can be a data coordinator and receive sensor information from the one or more sensors and transmit sensor information to the at least access point. Further, a first set of sensors are configured to be routing sensors and a second set of sensors are configured end point sensors based on a graph theoretic algorithm to reduce transmitting power of each sensor and reduce overall power of the wireless sensor network, and configuring a first operational wireless sensor network.

14 Claims, 14 Drawing Sheets

(56) References Cited

OTHER PUBLICATIONS

W. Liu, Y. Zhang, W. Lou, Y. Fang, "Conserve Energy Through Multiple-Packet Transmission in Heterogeneous Mobile Ad-Hoc Networks," Proc. IEEE MILCOM, Oct. 2005, Atlantic City.

W. Liu, Y. Zhang, K. Lu, Y. Fang, "Energy Conservation Through Resource-Aware Movement in Heterogeneous Mobile Ad Hoc Networks," Journal of Comb. Optim., Feb. 2006.

Y. Xing, R. Chandramouli, "Distributed Discrete Power Control For Bursty Transmissions Over Wireless Data Networks," Proc. IEEE ICC, Jun. 2004, Paris.

Y. Amir, C. Danilov, R. Muscaloiu-Elefteri, N. Rivera, "The SMesh Wireless Mesh Network," ACM Trans. on Comp. Systems, Sep. 2010, vol. 28, No. 3.

R. Muhammad, "Energy Efficient Topology Control in Wireless Sensor Networks," Proc. ACM SE, Mar. 2006, Melbourne, FL.

D. Lee, J. Liebman, J. Smith, "An O(nlog n) Heuristic for Steiner Minimal Tree Problems on the Euclidean Metric," Networks, 1981, vol. 11, p. 23-39.

R. Bhatia, M. Kodialam, "On Power Efficient Communication Over Multi-Hop Wireless Networks: Joint Routing, Scheduling and Power Control," IEEE INFOCOM, Mar. 2004, Hong Kong.

T. Elbatt, A. Ephremides, "Joint Scheduling and Power Control for Wireless Ad Hoc Networks," IEEE Trans. Wireless Comms, Jan. 2004, p. 74-85, vol. 3, No. 1.

A. Neishaboori, G. Kesidis, "Distributed Power Control in Multihop Ad Hoc CDMA Networks," Proc. IEEE ICC, Jun. 2007, Glasgow.

S. Hanly, D. Tse, "Power Control and Capacity of Spread-Spectrum Wireless Networks," Automatica, Dec. 1999.

Internet of Things—http://en.wikipedia.org/wiki/Internet_of_Things, Mar. 14, 2013.

XBee/XBee-PRO RF Modules, Digi International. www.digi.com, Mar. 14, 2013.

D. West. Introduction to Graph Theory. 2001, Prentice Hall, Upper Saddle River, NJ.

\* cited by examiner

|   | A | B | C | D | E | F | G | H | I | J |
|---|---|---|---|---|---|---|---|---|---|---|
| A | 0 | 14.807 | 9.2025 | 9.6022 | 8.8618 | 5.6335 | 11.766 | 19.584 | 4.844 | 11.539 |
| B | 14.807 | 0 | 7.9504 | 5.2089 | 18.054 | 13.132 | 5.3432 | 4.9328 | 14.058 | 4.731 |
| C | 9.2025 | 7.9504 | 0 | 4.3963 | 15.959 | 10.779 | 3.0199 | 11.767 | 11.094 | 3.2913 |
| D | 9.6022 | 5.2089 | 4.3963 | 0 | 13.857 | 8.644 | 3.9892 | 10.009 | 9.3819 | 3.2166 |
| E | 8.8618 | 18.054 | 15.959 | 13.857 | 0 | 5.2663 | 17.498 | 22.894 | 4.8844 | 16.901 |
| F | 5.6335 | 13.132 | 10.779 | 8.644 | 5.2633 | 0 | 12.232 | 18.047 | 1.1897 | 11.642 |
| G | 11.766 | 5.3432 | 3.0199 | 3.9892 | 17.498 | 12.232 | 0 | 8.7671 | 12.791 | 0.8689 |
| H | 19.584 | 4.9328 | 11.767 | 10.009 | 22.894 | 18.047 | 8.7671 | 0 | 18.988 | 8.5367 |
| I | 4.844 | 14.058 | 11.094 | 9.3819 | 4.8844 | 1.1897 | 12.791 | 18.988 | 0 | 12.257 |
| J | 11.539 | 4.731 | 3.2913 | 3.2166 | 16.901 | 11.642 | 0.8689 | 8.5367 | 12.257 | 0 |

Figure 4C

|   | A | B | C | D | E | F | G | H | I | J |
|---|---|---|---|---|---|---|---|---|---|---|
| A | 0 | 9 | 4 | 4 | 4 | 4 | 9 | 16 | 1 | 9 |
| B | 9 | 0 | 4 | 4 | 16 | 9 | 4 | 1 | 9 | 1 |
| C | 4 | 4 | 0 | 1 | 16 | 9 | 1 | 9 | 9 | 1 |
| D | 4 | 4 | 1 | 0 | 9 | 4 | 1 | 9 | 4 | 1 |
| E | 4 | 16 | 16 | 9 | 0 | 4 | 16 | 16 | 1 | 16 |
| F | 4 | 9 | 9 | 4 | 4 | 0 | 9 | 16 | 1 | 9 |
| G | 9 | 4 | 1 | 1 | 16 | 9 | 0 | 4 | 9 | 1 |
| H | 16 | 1 | 9 | 9 | 16 | 16 | 4 | 0 | 16 | 4 |
| I | 1 | 9 | 9 | 4 | 1 | 1 | 9 | 9 | 0 | 9 |
| J | 9 | 1 | 1 | 1 | 16 | 9 | 1 | 4 | 9 | 0 |

Figure 4D

| Link 1 | A | I |
| --- | --- | --- |
| Link 2 | B | H |
| Link 3 | B | J |
| Link 4 | C | D |
| Link 5 | C | G |
| Link 6 | E | I |
| Link 7 | F | I |
| Link 8 | G | J |
| Link 9 | A | C |

Figure 4E

SYSTEMS, DEVICES, AND METHODS OF MANAGING POWER CONSUMPTION IN WIRELESS SENSOR NETWORKS

CROSS-REFERENCE TO RELATED APPLICATIONS

The present application claims priority under the laws and rules of the United States, including 35 USC §120, to U.S. Provisional Patent Application No. 61/429,429 filed on Jan. 3, 2011. The contents of U.S. Provisional Patent Application No. 61/429,429 are herein incorporated by reference.

BACKGROUND

The Internet is evolving from an "Internet of Human Beings" to an "Internet of Things". Such a trend includes connecting millions of objects like thermostats, electric power meters, and every conceivable machine used in the daily lives of consumers directly or indirectly to one another and to access points and servers so that the objects, which are controlled using remote sensor nodes, are managed in an optimal and efficient manner.

BRIEF SUMMARY

Embodiments of the present disclosure include systems, methods, and devices for managing power consumption in a wireless sensor network. Such embodiments may include (a) a remote server, a wide area network coupled to the remote server, at least one access point device coupled to the remote server through the wide area network, one or more sensors coupled to each other and to the access point through a wireless sensor network, as well as one or more datasinks wherein each datasink is capable of being a data coordinator and capable of receiving sensor information from the one or more sensors and transmits sensor information to the at least access point. Further, a first set of sensors are configured to be one or more routing sensors and a second set of sensors are configured to be one or more end point sensors based on a graph theoretic algorithm to reduce transmitting power of each sensor and reduce overall power of the wireless sensor network, and configuring a first operational wireless sensor network. In addition, the first set of sensors and second set of sensors is each a subset of the one or more sensors and a sensor is capable of being a routing sensor and an endpoint sensor.

The graph theoretic algorithm includes selecting a link wherein the link couples a node pair and a node can be selected from the group consisting of an access point, datasink, routing sensor, or endpoint sensor and mapping the distance between the selected node pairs to a corresponding bridging power level wherein the bridging power level between a node pair is designated as a weight of the link. Further, the graph theoretic algorithm includes ranking the weighted links for each corresponding node pair in nondecreasing order of weight and selecting a next least weighted link and corresponding node pair as part of a subgraph. In addition, the graph theoretic algorithm may include repeating the selecting of the next least weighted link and corresponding node pair as part of the subgraph until every node is part of the subgraph and generates a spanning tree.

In such an embodiment, the remote server uses the graph theoretic algorithm to configure the first set of sensor as routing sensors and the second of sensors as end point sensors over the wide area network through the access point. The datasink may receive sensor information corresponding to each of the one or more routing sensors and one or more end point sensors and process the sensor information to generate sub-network information. Also, the access point transmits the sensor information and the sub-network information to the remote server over the wide area network. Another aspect of the embodiment may be the remote server processing the sensor information for a subset of the one or more routing sensors and one or more end point sensors and the network and sub-network information, modifying the configuration of the one or more routing sensors and one or more end point sensors based on the sensor information and network and sub-network information to generate a second operational wireless sensor network.

Such an embodiment may also include a remote computing device coupled to the access point and the remote server over the wide area network, the remote computing device having a user interface capable of receiving user input and retrieving and displaying sensor information and network and sub-network information. Further, the datasink (i) receives sensor information corresponding to each of the one or more routing sensors and one or end point sensors; (ii) processes the sensor information to generate sub-network information and the access point transmits the sensor information and the sub-network information to the remote computing device and the remote server over the wide area network.

Included in the embodiment may be the remote computing device that processes the sensor information for a subset of the one or more routing sensors and one or more end point sensors and the network and sub-network information in response to a first user input as well as modifies the configuration of the one or more routing sensors and one or more end point sensors based on the sensor information and network and sub-network information in response to a second user input to generate a third operational wireless sensor network. Moreover, the graph theoretic algorithm is Kruskal's algorithm which is used to a generate spanning tree.

Embodiments of the present disclosure include a method for managing power consumption in a wireless sensor network. Such a method includes selecting a link wherein the link couples a node pair and a node can be an access point, routing sensor, or endpoint sensor, mapping the distance between the selected node pairs to a corresponding bridging power level wherein the bridging power level between a node pair is designated as a weight of the link as well as ranking the weighted links for each corresponding node pair in nondecreasing order of weight and selecting a next least weighted link and corresponding node pair as part of a subgraph. Further, the exemplary method repeats the selecting of the next least weighted link and corresponding node pair as part of the subgraph until every node is part of the subgraph and generates a spanning tree.

The exemplary method may also include receiving sensor information corresponding to each of the one or more routing sensors and one or more end point sensors from one or more devices, the one or more devices selected form the group of one or more access points and one or more datasinks, processing the sensor information to generate sub-network information by one or more devices, the one or more devices selected form the group of one or more access points and one or more datasinks and transmitting the sensor information and the sub-network information to the remote server over the wide area network by one or more access points.

In addition, the exemplary method may include processing the sensor information for a subset of the one or more routing sensors and one or more end point sensors and the network and sub-network information and modifying the configuration of the one or more routing sensors and one or more end point sensors based on the sensor information and network and sub-network information to generate a second operational wireless sensor network.

Other steps in the exemplary method may be receiving sensor information corresponding to each of the one or more routing sensors and one or end point sensors from one or more devices, the one or more devices selected form the group of one or more access points and one or more datasinks, processing the sensor information to generate sub-network information by one or more devices, the one or more devices selected form the group of one or more access points and one or more datasinks, and transmitting the sensor information and the sub-network information to the remote computing device and the remote server over the wide area network by one or more access points.

Further steps in the exemplary method may include processing the sensor information for a subset of the one or more routing sensors and one or more end point sensors and the network and sub-network information in response to a first user input, modifying the configuration of the one or more routing sensors and one or more end point sensors based on the sensor information and network and sub-network information in response to a second user input to generate a third operational wireless sensor network.

Embodiments of the disclosure may include an access point device for managing power consumption in a wireless sensor network. Such an exemplary device may include a processor, a memory coupled to the processor, and one or more communication interfaces coupled to the processor. Further, the device (i) stores the sensor information and the network information in the memory; (ii) receives sensor information corresponding to each of the one or more routing sensors and one or more end point sensors form the one or more communication interfaces; (iii) processes the sensor information to generate network information using the processor implementing a graph theoretic algorithm; and (iv) transmits the sensor information and the network information to the one or more communication interfaces.

Other embodiments may include a remote server device for managing power consumption in a wireless sensor network. The exemplary device may include a processor, a memory coupled to the processor, and one or more communication interfaces coupled to the processor. Further the device: (i) stores the sensor information and the network information in the memory; (ii) processes the sensor information for a subset of the one or more routing sensors and one or more end point sensors and the network information using the processor implementing a graph theoretic algorithm; (iii) transmits reconfiguration data of the one or more routing sensors and one or more end point sensors based on the sensor information and network information using the processor through the one or more communication interfaces. The foregoing summary is illustrative only and is not intended to be in any way limiting. In addition to the illustrative aspects, embodiments, and features described above, further aspects, embodiments, and features will become apparent by reference to the drawings and the following

DETAILED DESCRIPTION BRIEF DESCRIPTION OF THE SEVERAL VIEWS OF THE DRAWINGS

The accompanying drawings, which are incorporated in and constitute part of this specification, illustrate embodiments of the invention and together with the description serve to explain the principles of the present disclosure. The embodiments illustrated herein are presently preferred, it being understood, however, that the invention is not limited to the precise arrangements and instrumentalities shown, wherein:

FIG. 4C is an example distance matrix for the wireless sensor network shown in FIG. 4B.

FIG. 4D is an example power level matrix corresponding to the example distance matrix shown in FIG. 4C;

FIG. 4E is an example of an output matrix of reduced spanning tree links for the wireless sensor network shown in FIG. 4B;

DETAILED DESCRIPTION OF THE INVENTION

Figure 1A:
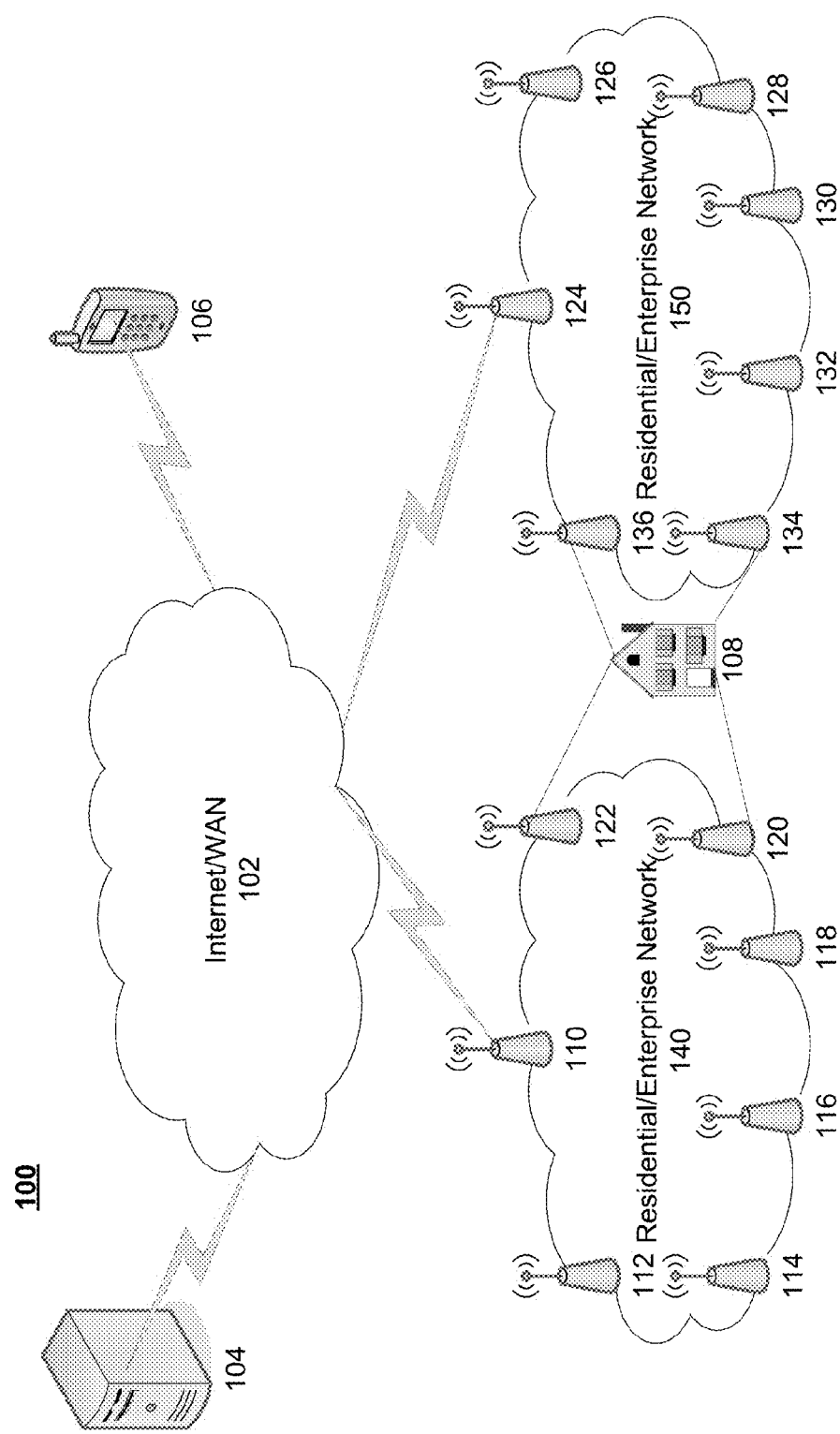
FIGS. 1A and 1B are exemplary networks of a wireless sensor network that illustrates aspects of the present disclosure.

In the following detailed description, reference is made to the accompanying drawings, which for a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the following description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

FIG. 1A is exemplary network 100 of a wireless sensor network(s) (140 and 150) that illustrates aspects of the present disclosure. The network 100 includes a residence or business 108 having two wireless sensor networks (140 and 150). Persons of ordinary skill in the art would understand that other embodiments may include a single wireless networks or three or more wireless networks. Each wireless network (140 and 150) may have one or more wireless sensors (110-122 and 124-136). One wireless sensor in each wireless sensor network (140 and 150) may be an access point sensor (110 and 124). The access point sensor may have management and/or control software to manage and control the other wireless sensors (112-122 and 126-136). Further each access point sensor (110 and 124) may be coupled to a communication network 102 such as the Internet or a Wide Area Network (WAN). In addition, a remote computer server 104 and/or a client computing device 106 may be coupled to the communication network 102. The remote computer server 104 and/or the client computing device 106 may remotely manage and control the wireless sensors (110-136) in the wireless sensor networks (140 and 150). Although FIG. 1A shows the client computing device 106 to be a smartphone, persons of ordinary skill in the art would recognize that in other embodiments the client computing device 106 may be a mobile phone, tablet computer, laptop computer, desktop computer or any other type of client computing device known in the art.

In an embodiment, the wireless sensors or sensors nodes (112-122 and 126-136) are under the control of an access point sensor (110 and 124). The access point sensor is coupled to a communication network 102 and the access point sensor (110 and 124) can be managed and controlled by a remote server. The sensor nodes (110-122 and 124-136) may be randomly located in a bounded area and in one embodiment the wireless sensors (110-122 and 124-136) may control the total power consumption of the sensor nodes (110-122 and 124-136), including that of the access point sensor (110 and 124) such that the total power consumption of the wireless sensors (110-136) is reduced. This is because the wireless sensors (110-136) may be distributed over a wide area, including in locations which are not easily accessible. Thus, the number of sensors and the type of sensors could be large and varied, especially in industrial applications. In one embodiment, the nodes (1110-136) of the sensor network may be used, among other things, for observation and control of elements like thermostats, electrical outlets, electric meters, etc. in an energy management system. Other embodiments may include other applications such as reading water/gas meters, control of security cameras and motion sensors, etc.

Several conventional techniques for power conservation of wireless sensor nodes involve a game-theoretic framework. Alternatively, the pending disclosure describes a graph-theoretic approach such that in a wireless sensor network, sensor nodes are designated as either a routing node or an endpoint node. In one embodiment, a wireless sensor node may consume a certain level of power regardless of whether the wireless sensor node is a routing node or a sensor node. A parameter that significantly affects power consumption of a sensor node is power level of a sensor's transmitter, a needed transmitter power level being a function of the distance the sensor node is required to bridge to communicate with a destination node.

In such an embodiment, in order to ensure that overall power consumption of the nodes in the wireless is minimal, sensor nodes and the links interconnecting all of the node pairs may be designated as a set of vertices and edges of a weighted graph to obtain the minimum spanning tree. A graph theoretic algorithm such as Kruskal's algorithm or Dijkstra's algorithm, may be used to generate the minimum spanning tree considering edges in nondecreasing order of weight, which may represent the power level required for the two incident nodes to communicate. The power level required to bridge the distance between nodes may include the effects of noise, interference, and other impairments. The overall power consumption of a wireless sensor network (WSN) can be minimized by designating certain sensor nodes to route information to other sensor nodes based on node proximity. The topology resulting from the application of such graph theoretic algorithms facilitates the choice of the routing nodes and the resulting WSN structure operates in such a way that each node is set at the minimum power level possible, thus reducing the overall power consumption of the WSN.

Figure 1B:
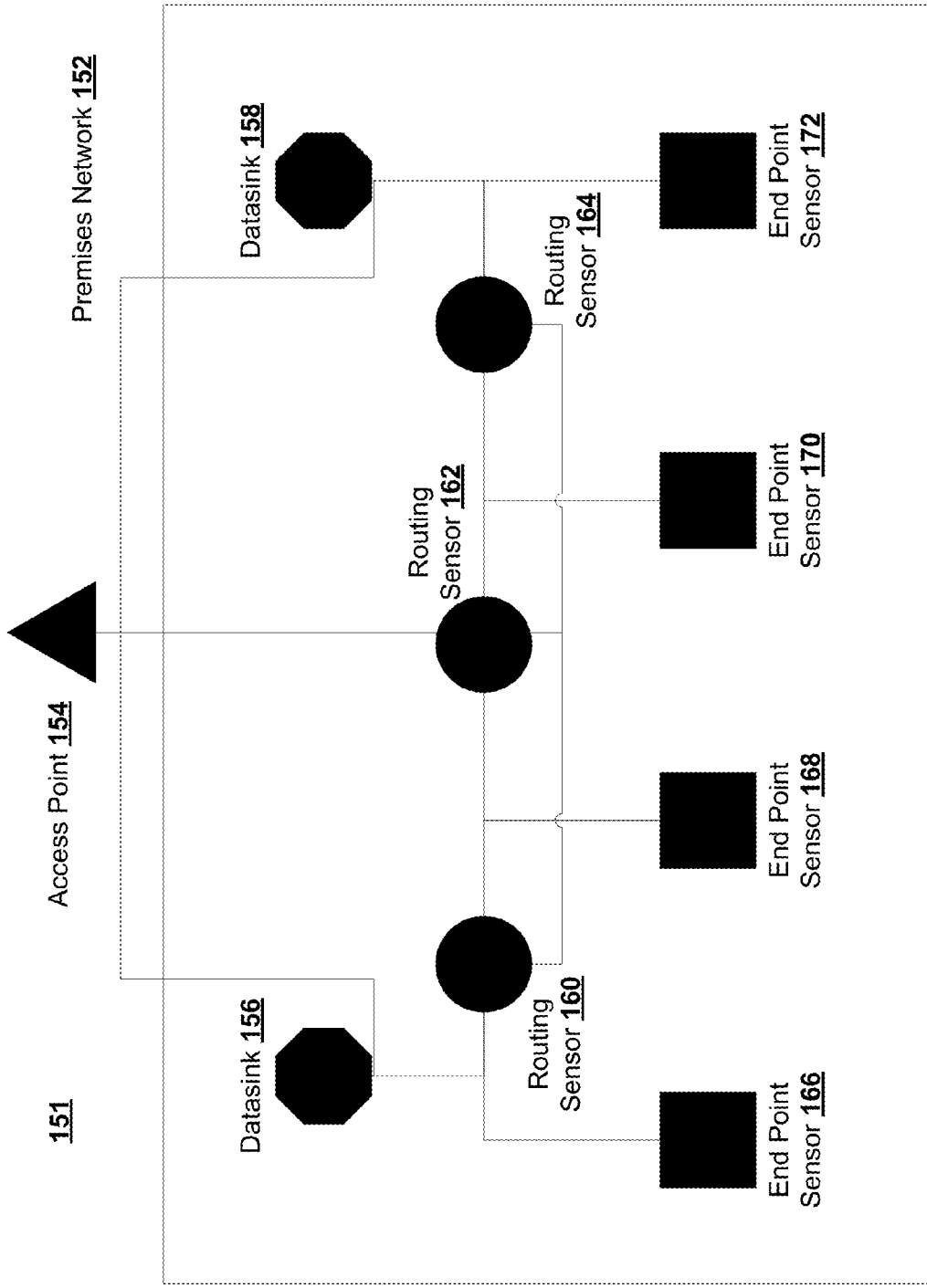

FIG. 1B is exemplary network 151 of a wireless sensor network 152 that illustrates aspects of the present disclosure. The exemplary network includes several end sensors (166-172), several routing sensors (160-164), several datasinks (156-158) and an access point 154. Wireless sensor network 152 may perform one application and perform a mix of applications. In one embodiment, each sensor (160-172) in the wireless sensor network 152 may be a motion sensor that is part of a security system for the premises. In another embodiment, some of the sensors may be motion sensors while others are temperature sensors. Thus, a third party provider may gather information from and then manage the sensors accordingly.

Each of the end point sensors (166-172) may be located in a portion of the premises and gathers information (e.g. motion, temperature, etc.). An end point sensor (166-172) may be coupled wirelessly to one or more routing sensors (160-164). Routing sensors may have the same capability as end point sensors in terms of gathering information (e.g. motion, temperature, etc.). However, in addition to such capability, each routing sensor may receive information from one or more endpoint sensors as well as its own gathered information and transmit the sensor information to one or more datasinks (156-158) or the access point. Further, an end point sensor may also transmit gathered information to the one or more datasinks (156-158). In addition, the datasinks (156-158) may query the end point and routings sensors for information. Datasinks (156-158) gather information from the endpoint and routing sensors then process and manage the gathered information. Such functions performed by the datasink (156-158) may be referred to as data coordination. Once information is gathered and possibly processed and the end point and routing sensors are managed, the datasink transmits the gathered information to the access point 154 for further processing or forwards to a remote computer server. The access point 154 may receive the information from the datasinks (156-158) as well as the routing sensors (160-162). In other embodiments, end point sensors (166-172) may be able to transmit gathered information to the access points 154 directly. The devices shown in FIG. 1B including the access point 154, datasinks (156-158), routing sensors (160-164) and end point sensors (166-172) may be coupled to each other wirelessly, wired, a mix of wireless and wired, or any other coupling mechanism known in the art.

Figure 2A:
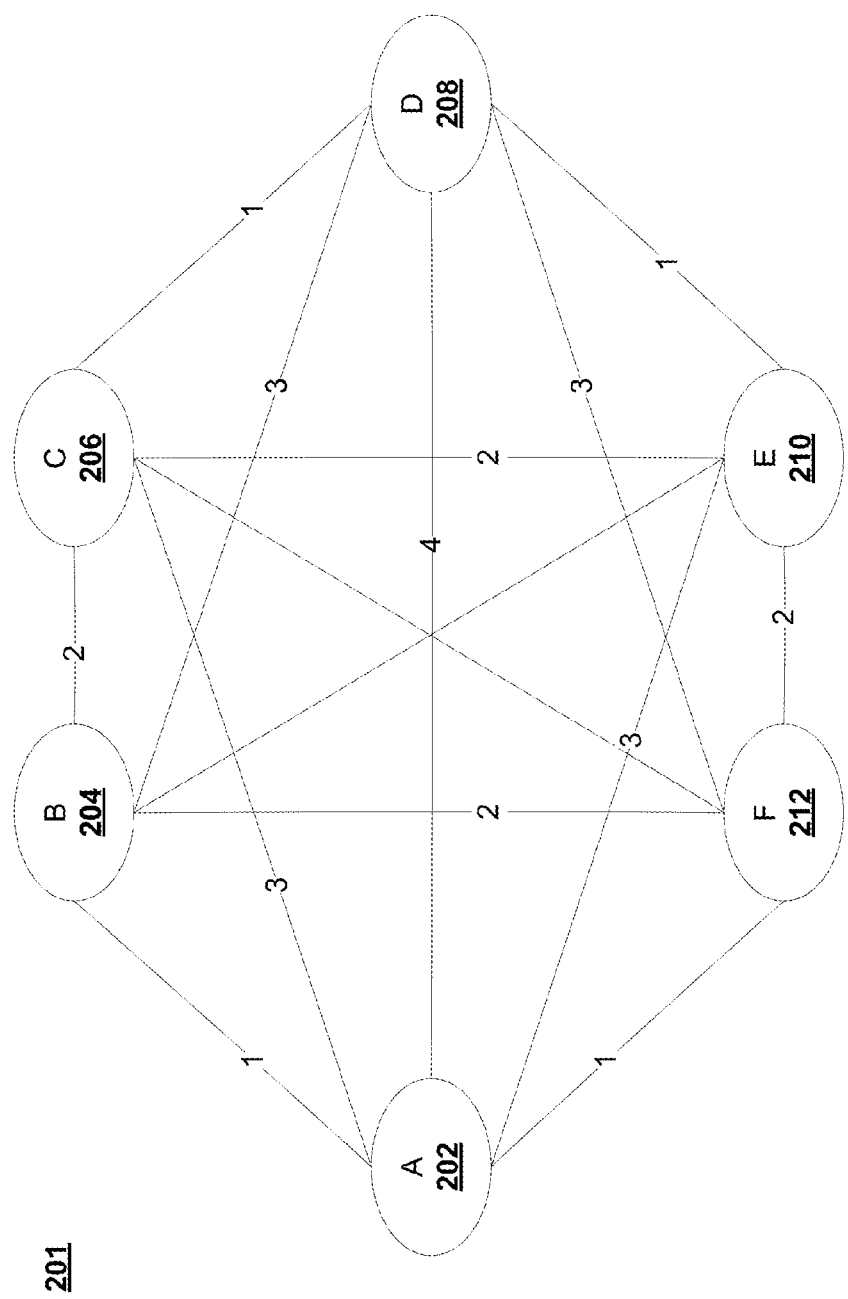
FIGS. 2A and 2B are exemplary graph theory diagrams that illustrates aspects of the present disclosure.
Figure 2B:
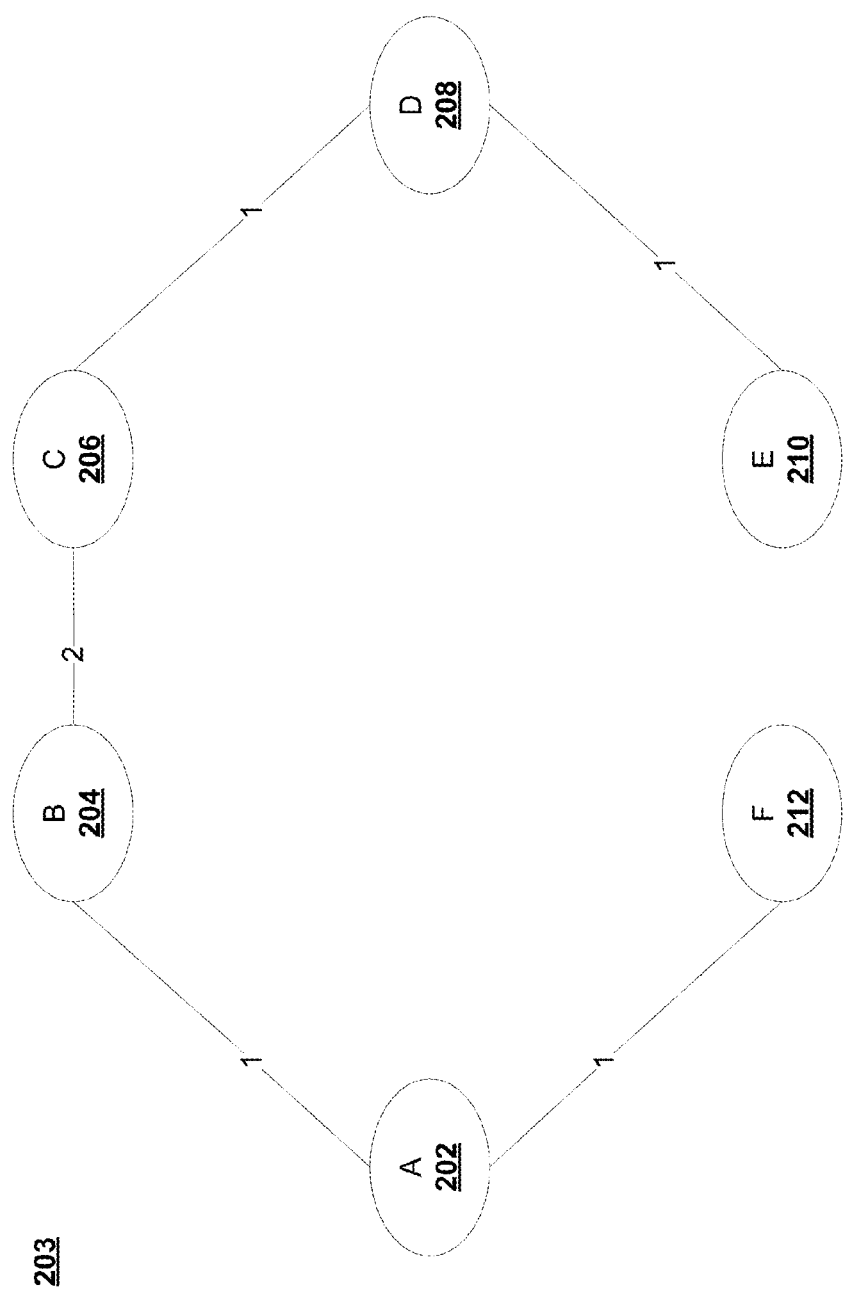

FIGS. 2A and 2B are exemplary graph theory diagrams that illustrate aspects of the present disclosure. The description of FIGS. 2A and 2B discuss using a graph theoretic algorithm for a power conservation application. FIGS. 2A and 2B include sensor nodes A-F (202-212). Referring to FIG. 2A, the numbers 1, 2, 3, etc. designated each link denote the weights of the corresponding link connecting the adjacent nodes. In one embodiment, the weight 1 denotes that the power level required for Node A to communicate with Node B is a power level of 1 (say 0 dBm, 1 mW). Power level 2 is 3 dBm, or 2 mW, and similarly power level 4 is 6 dBm, or 4 mW. It is to be noted that these parameters are illustrative and may conform to the specifications of commonly used Zigbee modules. Persons of ordinary skill in the art would understand that other embodiments of the present disclosure may use the graph theoretic algorithms discussed herein for other industry applications such as reading water/gas meters, control of security cameras and motion sensors, etc.

In one embodiment, Node A in FIG. 2A may an access point (AP) node, and configured to a power level of 4, such that Node A may be able to communicate with any of the five other nodes in the WSN. A power level of 1 corresponds to 1 mW of transmitter power, but actual power dissipation may be more than 1 mW because of the inefficiency of the transmitter circuitry and the transmitter power amplifier. To communicate back to Node A, however, Node D may have to configure to a power level 4, Nodes C and E at power level 3, and Nodes B and F at power level 1, respectively. Total power consumption of all of the nodes in a topology shown in FIG. 1A is 4+4+3+3+1+1=16 units, (assuming that all the power consumption is due to the dissipation in the transmitters).

Referring to FIG. 2B, Nodes B, C, E, and F may be designated as routing nodes. For Node A to communicate with Node D, it can route packets through Node B and Node C or through Node F and Node E. Thus, the topology of the WSN in FIG. 2A can be reduced to a topology shown in FIG. 2B. In FIG. 2A, Node B, Node C, and Node D are routing nodes and as a result Node A can operate at a power level of 1. Nodes B and C can operate at a power level of 2. Further, Nodes D, E, and F will need to operate at a power level of only 1 for the WSN in FIG. 2A and 2B to work reliably. Referring to FIG. 2B, the AP (Node A) can route data and control information to each and every node and every node which in turn can communicate back to the AP (Node A) either directly or through intermediate routing node(s). Thus, overall power consumption for the WSN shown in FIG. 2 is 1+2+2+1+1+1=8 units. Thus, using the graph theoretic algorithm described in reference to FIG. 2B reduces the overall power consumption of the WSN when compared to the power consumption of the topology shown in FIG. 2A. FIG. 2A illustrates the result of Kruskal's Algorithm when applied to the topology of the WSN depicted in FIG. 2.

The graph theoretic algorithm described in reference to FIG. 2A can be applied to random and complex topologies. For example, each node in such a random or complex topology may have a Zigbee controller of the type commonly available and is part of every sensor node. Further, distances between any node pair is known corresponds to a specified power level (for a power conservation application) for reliable communication and that power level is also known a priori and is constant, even though in other embodiments of the present disclosure this may not be the case.

Figure 3A:
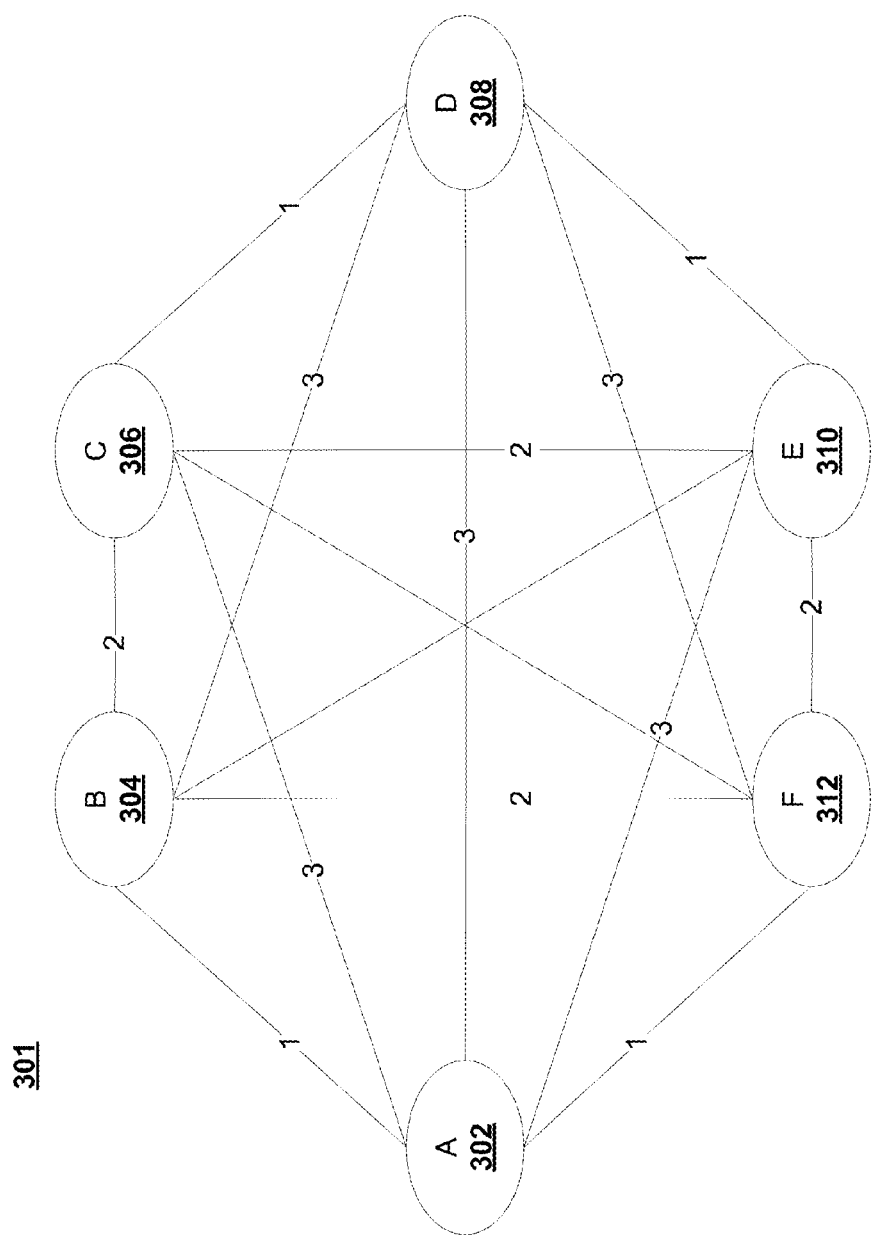
FIGS. 3A-3C are exemplary graph theory diagrams that illustrates aspects of the present disclosure.
Figure 3B:
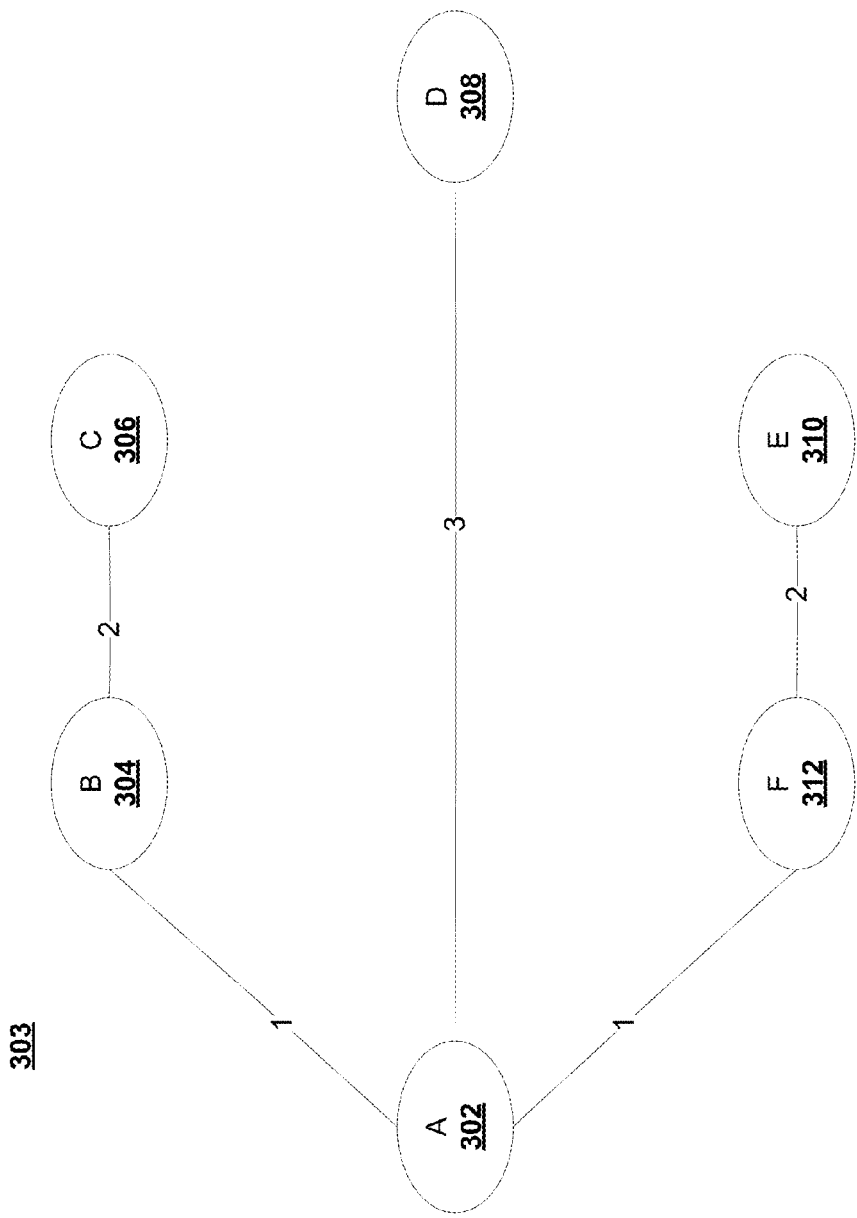
Figure 3C:
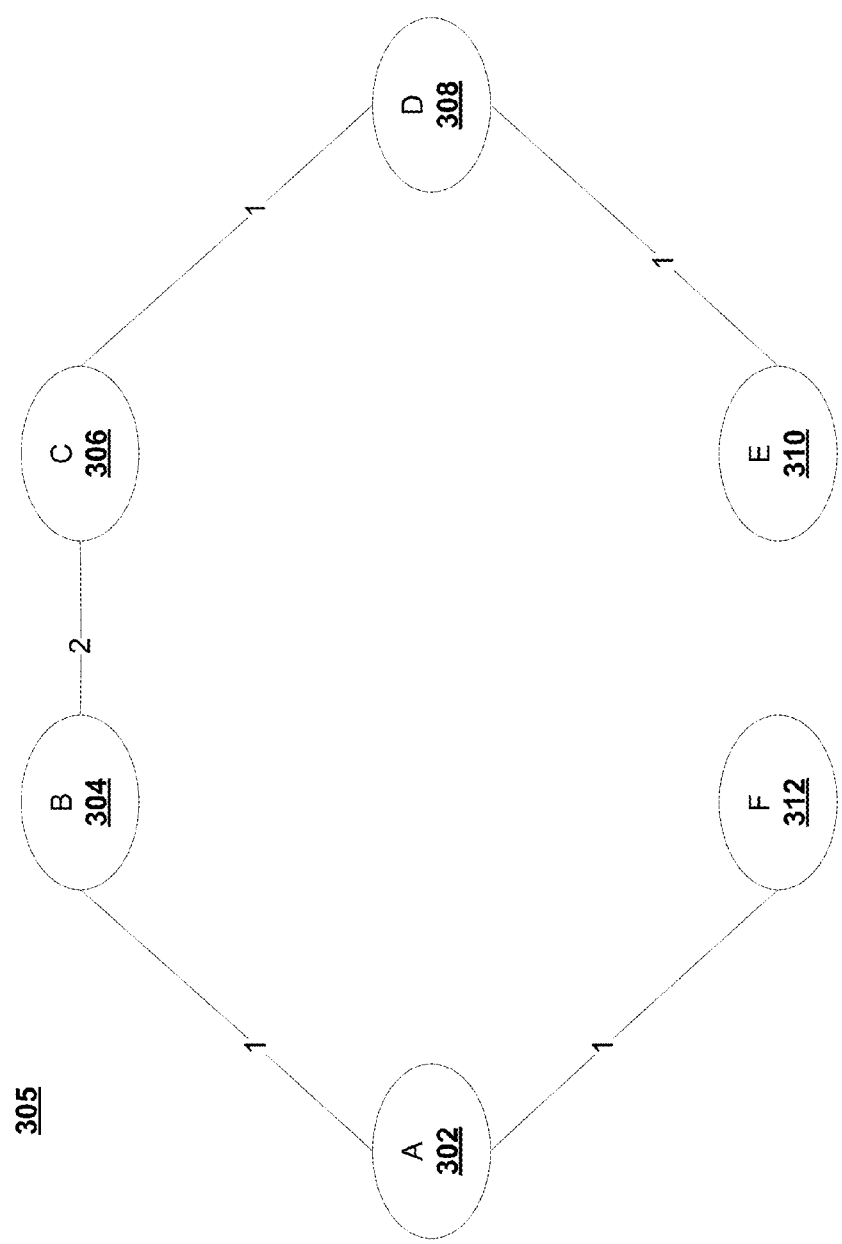

FIGS. 3A-3C are exemplary graph theory diagrams that illustrate aspects of the present disclosure. FIGS. 3A and 3B illustrate an embodiment such that Dijkstra's algorithm is used as a graph theoretic algorithm to reduce power consumption in a wireless sensor network (WSN). Referring to FIG. 3A, the numbers 1, 2, 3, etc. designated each link denote the weights of the corresponding link connecting the adjacent nodes. In one embodiment, the weight 1 denotes that the power level required for Node A to communicate with Node B is a power level of 1 (say 0 dBm, 1 mW). Power level 2 is 3 dBm, or 2 mW, and similarly power level 4 is 6 dBm, or 4 mW. It is to be noted that these parameters are illustrative and may conform to the specifications of commonly used Zigbee modules. Persons of ordinary skill in the art would understand that other embodiments of the present disclosure may use the graph theoretic algorithms discussed herein for other industry applications such as reading water/gas meters, control of security cameras and motion sensors, etc.

In one embodiment, node A in FIG. 3A may an access point (AP) node, and configured to a power level of 3, such that node A may be able to communicate with any of the five other nodes in the WSN. A power level of 1 corresponds to 1 mW of transmitter power, but actual power dissipation may be more than 1 mW because of the inefficiency of the transmitter circuitry and the transmitter power amplifier. To communicate back to Node A, however, Node D may have to configure to a power level 3, Nodes C and E also at power level 3, and Nodes B and F at power level 1, respectively. Total power consumption of all of the nodes in a topology shown in FIG. 3A is 3+3+3+3+1+1=14 units, (assuming that all the power consumption is due to the dissipation in the transmitters).

Dijkstra's Algorithm can be used to generate a spanning tree structure for networks modeled as weighted graphs. However, the type of spanning tree which Dijkstra's algorithm generates is one which takes a root node in the network and determines the minimum-weight path from the root node to every other node in the network. In the case of the WSN depicted in FIG. 3A, Dijkstra's Algorithm results in determining the minimum-weight (minimum power level) path from a root node, for example Node A, to every other node (Nodes B-F) in the WSN. Other embodiments, may have the goal of generating a spanning tree with the minimum total weight, so that the overall power requirement for communication in the WSN is conserved/reduced.

Referring to FIG. 3B, the resulting spanning tree is shown utilizing Dijkstra's Algorithm with Node A as the root node in the network. Dijkstra's Algorithm finds a shortest path from the root node (e.g. Node A) to every other node. In finding the shortest path between the root node and another node in the WSN, the power consumption for each path is determined and then the shortest path is selected. For example, between Node A and Node D there are many paths each having a certain power consumption. Three of the shorter paths between Node A and Node D are: 1) A-B-C-D; 2) A-F-E-D; 3) and A-D. The corresponding power consumption for each path can be determined as follows: 1) A-B-C-D=1+2+1=4; 2) A-F-E-D=1+2+1=4; 3) and A-D=3. Thus, by analyzing the power consumption of each of the three paths it can be determined that A-D is the shortest path (i.e. the path with the lowest power consumption. Applying Dijkstra's algorithm to each node (with Node A as the root node) yields the spanning tree shown in FIG. 3B. Persons of ordinary skill in the art would recognize form embodiments disclosed that there may be many different ways to apply or implement Dijkstra's algorithm to a WSN as is known in the art.

Alternatively, in another embodiment, Kruskal's Algorithm takes a weighted graph such as in FIG. 3A and builds an acyclic spanning subgraph H, where initially E(H)=null (empty set). The algorithm enlarges the subgraph H and adds edges with low weight to form a spanning tree. It considers edges in nondecreasing order of weight, breaking ties arbitrarily. At each iteration of building the subgraph H, if the current edge of minimum weight joins two components of H, the algorithm adds this edge to H; otherwise the algorithm discards this edge. The algorithm is terminated once H connects all of the nodes. This results in a spanning tree of minimum total weight. The spanning tree in FIG. 3C is the result of applying Kruskal's Algorithm to the network depicted in FIG. 3A. The embodiment having a topology which results in minimum weight also consumes the minimum total power. For example, the topology of FIG. 3C dissipates a total power of 8 units, while the topology in FIG. 3B dissipates a total power of 14 units. Thus, Kruskal's Algorithm may be more suitable for optimizing overall power consumption in a WSN because this algorithm takes a weighted graph and finds the minimum spanning tree, or the spanning tree with minimum total weight. Alternatively, Dijkstra's algorithm may be suitable when finding the least power consumption from a root node. In some embodiments this root node may be an access point sensor node that may be required to use less power. Alternative embodiments may include sensors powered by batteries and Dijkstra's algorithm may be used to conserve battery power for such a sensor node. In such an example, the sensor node with low battery power may be the root node when Dijkstra's Algorithm is applied to the WSN.

Figure 4A:
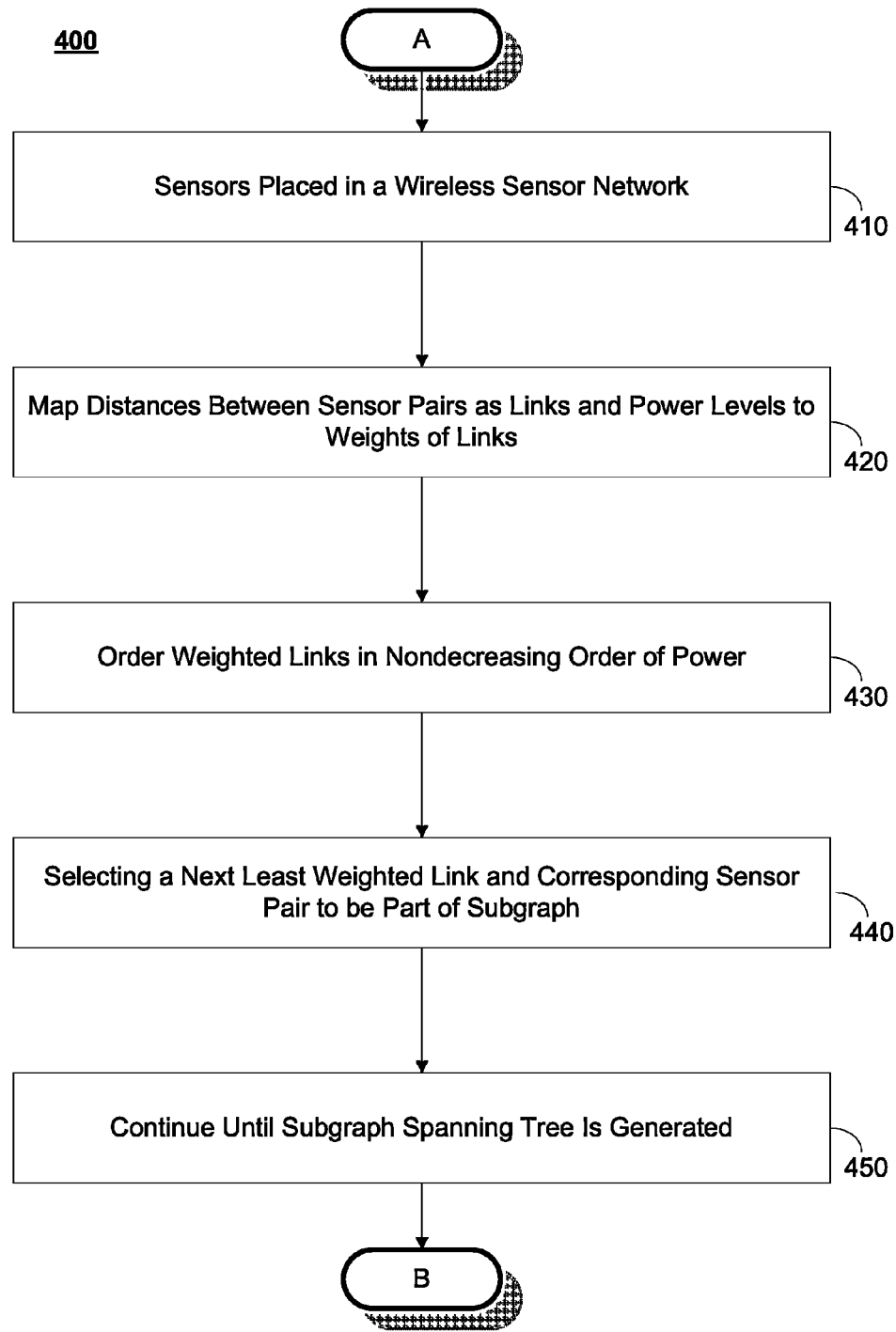
FIG. 4A is an exemplary flow chart showing an example method that is an aspect of the present disclosure.

FIG. 4 is an exemplary flow chart 400 showing an example method that is an aspect of the present disclosure. The flow chart 400 may incorporate Kruskal's algorithm. A step in the example method may be placing sensors in a wireless sensor network (WSN), as shown in block 410. The placement and location for each sensor in the WSN may be inputted to an access point, remote computer server or client computing device using known methods in the art. For example, a user may input the location using a user interface in the client computing device. Alternatively, there may be geolocation software applications on each sensor such that each sensor is able to determine its location and then transmit such location to the access point, remote computer server, or client computing device.

A further step in the example method may be mappings distances between sensor nodes in the WSN to the minimum required power levels for pair-wise node communication using software and/or hardware to detect the distance between sensor nodes. Alternatively, a user may enter the distances between sensor nodes using the user interface of the client computing device. Another step may be software application on the access point, remote computer server, or client computing device orders the links of the network in nondecreasing order of minimum required power for node communication into a $(N^2-N)/2$ by 2 matrix, where the number of rows in the matrix is the number of links available in the WSN, as shown in block 430.

An additional step in the example method selecting a specific link only if at least one of the nodes is not involved in the current subgraph, as shown in block 440. A further step in the method may be that after each node is involved in at least one link, the algorithm determines if the current subgraph is connected, ensuring that each node has a path to every other node in the WSN, as shown in block 450. If each node does not have a path to every other node in the WSN, then the algorithm chooses the remaining links incrementally to ensure that there is no longer any isolated component. Such a spanning tree should have N-1 links and can be a termination criterion for the algorithm when implemented by the software application. Further, the software application may output the routing nodes of the network and the total power required for communication among the nodes in the WSN.

Embodiments of the disclosure may not be dependent on the exact location of the AP node. Any node may arbitrarily be designated to be the AP node, simplifying overall organization of the WSN from an installation and maintenance point of view. In addition, the AP node location can be chosen keeping in mind the proximity of a node to the wired infrastructure.

As discussed previously, overall power consumption of a WSN can be reduced choosing certain sensor nodes to route information to other nodes based on node proximity. Further, Kruskal's Algorithm can be used to generate a minimum spanning tree where weights correspond to the power level required for a node pair to communicate. The spanning tree resulting from the application of Kruskal's Algorithm facilitates the choice of the routing nodes and the resulting WSN structure operates in such a way that each node is set at the minimum power level possible, thus minimizing the overall power consumption of the WSN.

Figure 4B:
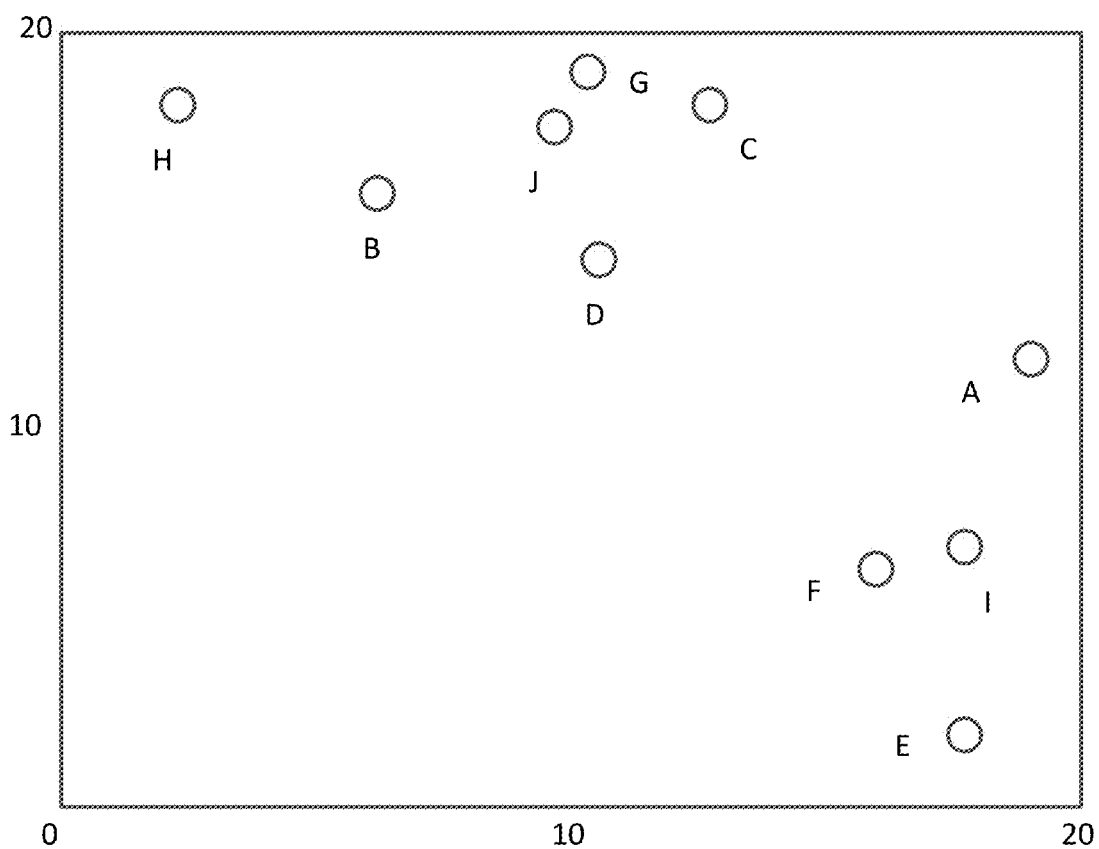
FIG. 4B is an example wireless sensor network.

FIG. 4B shows a random topology of a 10-Node network in a region of dimensions 20×20. FIG. 4C shows a matrix of distances between nodes in the random WSN shown in FIG. 4B. FIG. 4D shows the power level matrix corresponding to the WSN. In such an embodiment a distance of 5 units or less can be bridged with a power level of 1, distance of 5-10 units can be bridged by a power level of 4, and so on, with a power level of 16 being required to bridge a distance of 15-20 units.

Figure 4F:
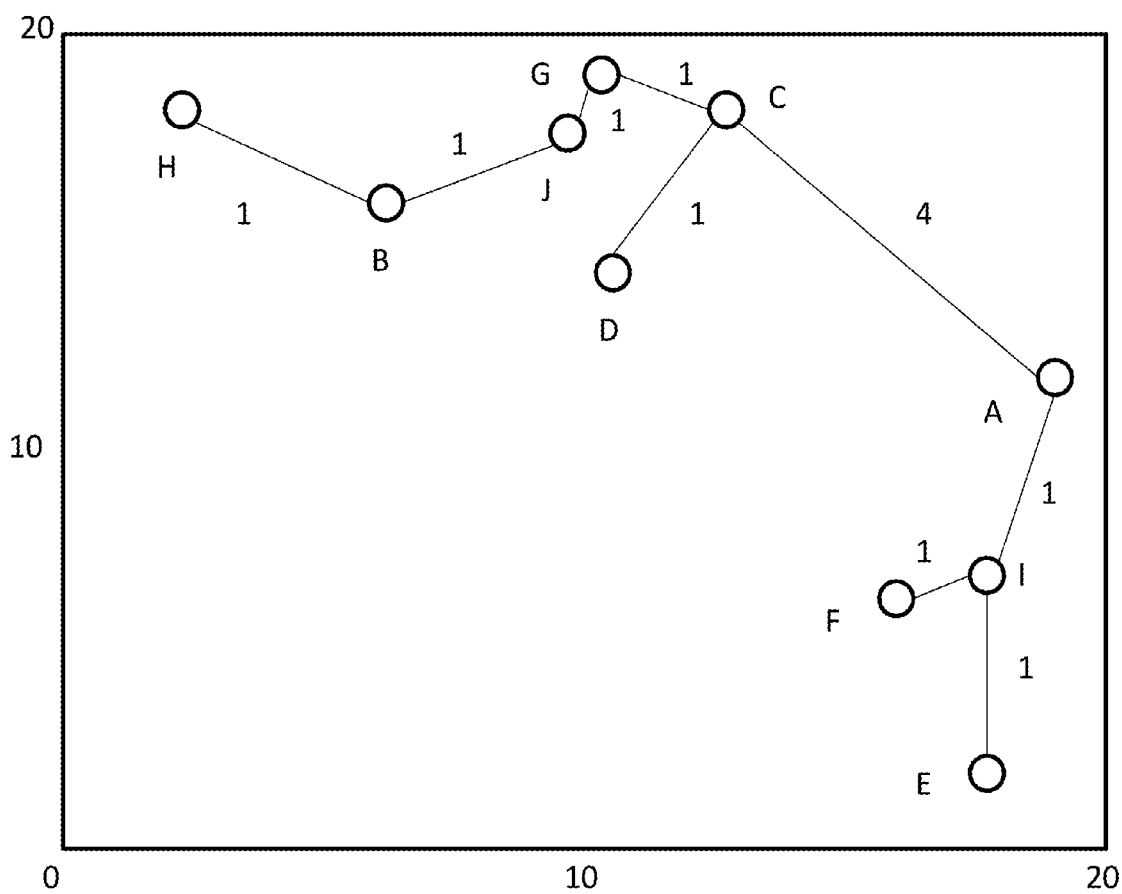
FIG. 4F is an example reduced spanning tree for the wireless sensor network shown in FIG. 4B.

Additionally, FIG. 4E shows the matrix of links of the minimum spanning tree generated by exemplary software application implementing a graph theoretic algorithm. The software application may be executed by an access point sensor node, a remote computer server, or a client computing device. FIG. 4F shows the reduced spanning tree structure providing a reduced or minimum overall power consumption on the network.

It can be determined that without the optimization step similar to the one proposed in this contribution, the overall power consumption of the WSN could be as much as 146 units, or the sum of the maximum transmitter power required for each node. The optimized topology resulting from the application of Kruskal's Algorithm requires a power consumption of 19 units, an 87% reduction in power consumption.

Figure 5:
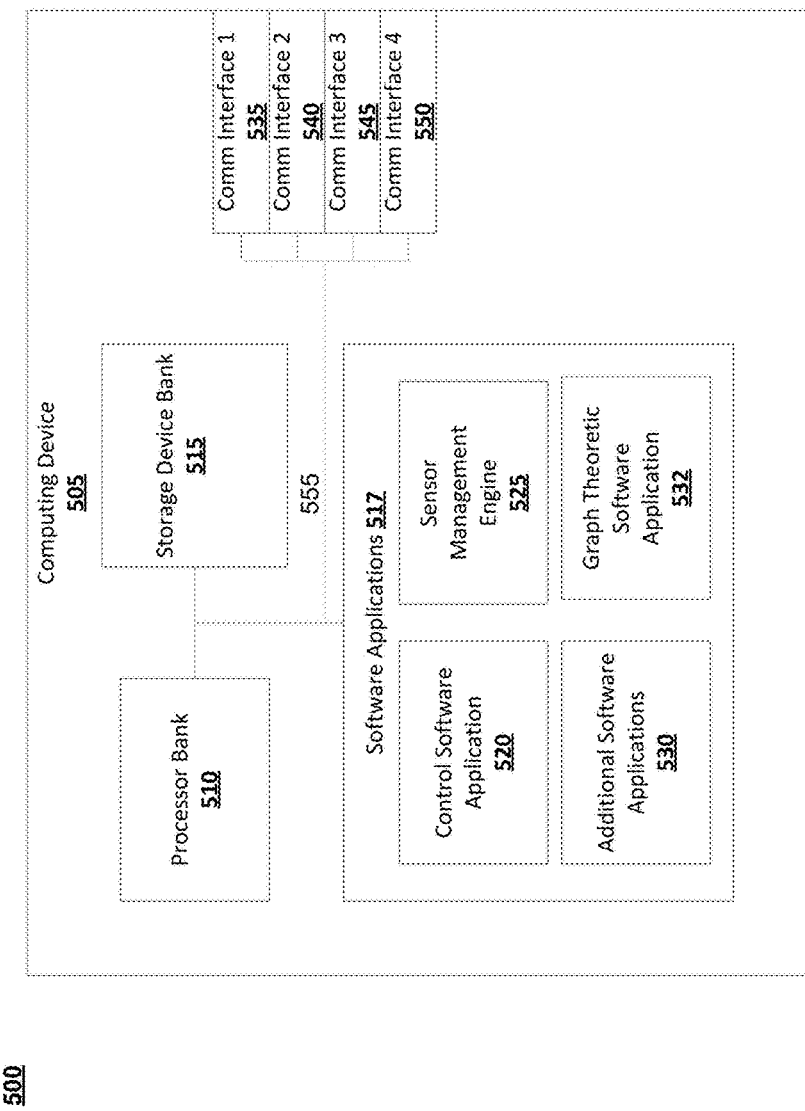
FIG. 5 is an exemplary functional block diagram of a computing device that may be used in as part of an aspect of the disclosure.

FIG. 5 is an exemplary functional block diagram of a computing device that may be used in as part of an aspect of the disclosure. The computing device may be an access point (or any sensor node), remote computer server, or client computing device used to configure, designate or determine one or more routing nodes or end point nodes in a wireless sensor network. A client computing device may be a smartphone, mobile phone, tablet computer, laptop computer, desktop computer or any other computing device.

The computing device 505 may include several different components such as a processor bank 510, storage device bank 515, one or more software applications 517, and one or more communication interfaces (535-550). The processor bank 510 may include one or more processors that may be co-located with each other or may be located in different parts of the computing device server 505. The storage device bank 515 may include one or more storage devices. Types of storage devices may include memory devices, electronic memory, optical memory, and removable storage media. The one or more software applications 517 may include control software applications 520, a sensor management engine 525, additional software applications 530, and graph theoretic software application. The control software applications may implement software functions that assist in performing certain tasks for the computing device 505 such as providing access to a communication network, executing an operating system, managing software drivers for peripheral components, and processing information. The additional software applications may include software drivers for peripheral components, user interface computer programs, debugging and troubleshooting software tools. The graph theoretic software application 532 receives as input a wireless sensor network topology and can apply one or more graph theoretic algorithms to determine a spanning tree to conserve overall power consumption of the wireless sensor network. The sensor management engine 525 receives the spanning tree determined by the graph theoretic algorithm and then remotely configures the individual sensor nodes of the WSN to be either an access point sensor node, routing nodes, and endpoint nodes. Specifically, the graph theoretic software application 532 receives the wireless sensor network topology using known techniques in the art. For example, the location of each node may be inputted using the user interface into the computing device 505 and relayed to the graph theoretic software application 532. Other examples may include the sensor nodes having geolocation capability to determine their location and transmitting their location to the computing device 505 across a communication network. Further, the graph theoretic software application 532 may implement an algorithm that includes selecting a link that couples a node pair and a node can be an access point, routing sensor, or endpoint sensor. In addition, the graph theoretic software application 532 may map the distance between the selected node pairs to a corresponding bridging power level such that the bridging power level between a node pair is designated as a weight of the link. Persons of ordinary skill in the art understand that bridging power level may be one embodiment of the present disclosure and that a weight of a link may correspond to other link attributes such as bandwidth/capacity, cost, similarity or difference of a nearest neighboring node, etc. and other applications known in the art. The graph theoretic software application 532 may also rank the weighted links for each corresponding node pair in nondecreasing order of weight and then select a next least weighted link and corresponding node pair as part of a subgraph. The graph theoretic software application 532 may repeat the selecting of the next least weighted link and corresponding node pair as part of the subgraph until every node is part of the subgraph and generates a spanning tree.

Further, in one embodiment, the sensor management engine 525 may receive the spanning tree from an intra-device link 555. Further, sensor management engine may determine which sensor nodes in the WSN have been designated routing nodes and which have been designated as endpoint nodes. The computing device 505 is coupled to one or more sensor nodes in the WSN across one or more communication networks. Thus, based on the spanning tree information, the sensor management engine may configure the one or more sensor nodes as routing nodes or endpoint nodes using command messages.

Further, the sensor management engine 525 receive sensor information from the routing nodes or the endpoint nodes and process the sensor information to generate sub-network information and transmit the sensor information and the sub-network information to another computing device. For example, the routing and endpoint nodes may provide the sensor management engine with the remaining battery life of each node. Further, the sensor management engine 525 may process such battery life information and determine that the remaining battery life of a specific node is below a threshold. Thus, the sensor management engine 525 may command the graph theoretic software application to apply Dijkstra's algorithm to the WSN using the specific node as the root node. In addition, the sensor management engine 525 may receive the resulting spanning tree from applying Dijkstra's algorithm and reconfigure the sensor nodes with different nodes being routing nodes and endpoint nodes.

Each of the communication interfaces (535-550) shown in FIG. 5 may be software or hardware associated in communicating to other devices. The communication interfaces (535-550) may be of different types that include a user interface, USB, Ethernet, WiFi, WiMax, wireless, optical, cellular, or any other communication interface coupled to communication network.

An intra-device communication link 555 between the processor bank 510, storage device bank 515, software applications 525, and communication interfaces (530-545) may be one of several types that include a bus or other communication mechanism.

Note that the functional blocks, methods, devices and systems described in the present disclosure may be integrated or divided into different combination of systems, devices, and functional blocks as would be known to those skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for managing power consumption in a wireless sensor network, the system comprising:
    (a) a remote computer server;
    (b) a wide area network coupled to the remote computer server;
    (c) at least one access point device coupled to the remote computer server through the wide area network,
    (d) one or more sensors coupled to each other and to the access point device through a wireless sensor network;
    (e) one or more datasinks wherein each datasink is capable of being a data coordinator and capable of receiving sensor information from the one or more sensors, processing sensor information, and transmitting processed sensor information to an access point device;
    (f) wherein the remote computer server, at least one access point device, one or more sensors, and one or more datasinks each have one or more processors and one or more memory storage devices;
    (g) wherein a first set of sensors are configured to be one or more routing sensors and a second set of sensors are configured to be one or more end point sensors based on a graph theoretic algorithm to reduce transmitting power of each sensor and reduce overall power of the wireless sensor network, and configuring a first operational wireless sensor network;
    (h) wherein the first set of sensors and second set of sensors is each a subset of the one or more sensors;
    (i) wherein a sensor is capable of being a routing sensor and an endpoint sensor;
    (j) wherein the graph theoretic algorithm, performed by the remote computer server, includes:
        (i) the remote computer server having a location of each node in the wireless sensor network;
        (ii) mapping a distance between node pairs to a corresponding bridging power level wherein the bridging power level between a node pair is designated as a weight of link wherein a link couples a node pair and node is selected from the group consisting an access point device, datasink, routing sensor, and endpoint sensor;
        (iii) ranking the weighted links for each corresponding node pair in nondecreasing order of weight;
        (iv) selecting a next least weighted link and corresponding node pair as part of a subgraph;
        (v) repeating the selecting of the next least weighted link and corresponding node pair as part of the subgraph until every node is part of the subgraph and generates a spanning tree;
    wherein the remote computer server:
        receives sensor information corresponding to each of the one or more routing sensors and one or more end point sensors from one or more devices, the one or more devices selected from the group of one or more access point devices and one or more datasinks;
        processes the sensor information to generate sub-network status information of the wireless sensor network.

2. The system of claim 1, wherein the remote computer server uses the graph theoretic algorithm to configure the first set of sensors as routing sensors and the second of sensors as end point sensors over the wide area network through the access point device.

3. The system of claim 1, wherein the datasink : (i) receives sensor information corresponding to each of the one or more routing sensors and one or more end point sensors; and (ii) processes the sensor information to generate sub-network status information.

4. The system of claim 1, wherein the access point device transmits the sensor information and the sub-network status information to the remote computer server over the wide area network.

5. The system of claim 4, wherein the remote computer server:
    processes the sensor information for a subset of the one or more routing sensors and one or more end point sensors and the network and sub-network status information;

modifies the configuration of the one or more routing sensors and one or more end point sensors based on the sensor information and network and sub-network status information to generate a second operational wireless sensor network.

6. The system of claim 1, the system further comprising a remote computing device coupled to the access point device and the remote computer server over the wide area network, the remote computing device having a user interface capable of receiving user input and retrieving and displaying sensor information and network and sub-network status information.

7. The system of claim 6, wherein the datasink (i) receives sensor information corresponding to each of the one or more routing sensors and one or more end point sensors; (ii) processes the sensor information to generate sub-network status information; and (iii) transmits the sensor information and the sub-network status information to the access point device;
wherein the access point device transmits the sensor information and the sub-network status information to the remote computing device and the remote computer server over the wide area network.

8. The system of claim 7, wherein the remote computing device:
provides instructions to the remote computer server to process the sensor information for a subset of the one or more routing sensors and one or more end point sensors and the network and sub-network status information in response to a first user input;
provides instructions to the remote computer server to modify the configuration of the one or more routing sensors and one or more end point sensors based on the sensor information and network and sub-network information in response to a second user input to generate a third operational wireless sensor network.

9. The system of claim 1, wherein the graph theoretic algorithm is Kruskal's algorithm which is used to generate spanning tree.

10. A method for managing power consumption in a wireless sensor network, the method comprising:
a remote computer server having a location for each node in the wireless sensor network;
mapping a distance between node pairs to a corresponding bridging power level wherein the bridging power level between a node pair is designated as a weight of link wherein a link couples a node pair and node is selected from the group consisting an access point device, datasink, routing sensor, and endpoint sensor;
ranking the weighted links for each corresponding node pair in nondecreasing order of weight;
selecting a next least weighted link and corresponding node pair as part of a subgraph;
repeating the selecting of the next least weighted link and corresponding node pair as part of the subgraph until every node is part of the subgraph and generates a spanning tree;
wherein the remote computer server receives sensor information corresponding to each of one or more routing sensors and one or more end point sensors from one or more devices, the one or more devices selected from the group of one or more access point devices and one or more datasinks;
wherein the remote computer server processes the sensor information to generate sub-network status information for one or more devices selected from the group of one or more access point devices and one or more datasinks.

11. The method of claim 10, the method further comprising:
processing, by remote computer server, the sensor information for a subset of the one or more routing sensors and one or more end point sensors and the network and sub-network status information;
modifying, by the remote computer server, the configuration of the one or more routing sensors and one or more end point sensors based on the sensor information and network and sub-network status information to generate a second operational wireless sensor network.

12. The method of claim 11, further comprising:
processing, by remote computer server, the sensor information for a subset of the one or more routing sensors and one or more end point sensors and the network and sub-network status information in response to a first user input;
modifying, by the remote computer server, the configuration of the one or more routing sensors and one or more end point sensors based on the sensor information and network and sub-network status information in response to a second user input to generate a third operational wireless sensor network.

13. An access point device for managing power consumption in a wireless sensor network, the device comprising:
a processor;
a memory coupled to the processor;
one or more communication interfaces coupled to the processor;
wherein the device (i) stores the sensor information and the network information in the memory; (ii) receives sensor information corresponding to each of the one or more routing sensors and one or end point sensors form the one or more communication interfaces; (iii) processes the sensor information to generate network information using the processor implementing a graph theoretic algorithm provided by a remote computer server; and (iv) transmits the sensor information and the network information to the one or more communication interfaces such that the sensor information is processed to generate sub-network status information of the wireless sensor network;
wherein the graph theoretic algorithm includes:
(i) the access point device having a location for each node in the wireless sensor network;
(ii) mapping a distance between node pairs to a corresponding bridging power level wherein the bridging power level between a node pair is designated as a weight of link wherein a link couples a node pair and node is selected from the group consisting an access point device, datasink, routing sensor, and endpoint sensor;
(iii) ranking the weighted links for each corresponding node pair in nondecreasing order of weight;
(iv) selecting a next least weighted link and corresponding node pair as part of a subgraph;
(v) repeating the selecting of the next least weighted link and corresponding node pair as part of the subgraph until every node is part of the subgraph and generates a spanning tree.

14. A remote computer server device for managing power consumption in a wireless sensor network, the device comprising:
a processor;
a memory coupled to the processor;
one or more communication interfaces coupled to the processor;

wherein the device: (i) stores the sensor information and the network information in the memory; (ii) processes the sensor information for a subset of the one or more routing sensors and one or more end point sensors and the network information using the processor implementing a graph theoretic algorithm; (iii) receives sensor information corresponding to each of the one or more routing sensors and one or more end point sensors from one or more devices, the one or more devices selected from the group of one or more access point devices and one or more datasinks; (iv) processes the sensor information to generate sub-network status information of the wireless sensor network; (v) transmits reconfiguration data of the one or more routing sensors and one or more end point sensors based on the sensor information and network information using the processor through the one or more communication interfaces;

wherein the graph theoretic algorithm includes:
  (i) the remote computer server having a location for each node in the wireless sensor network;
  (ii) mapping a distance between node pairs to a corresponding bridging power level wherein the bridging power level between a node pair is designated as a weight of link wherein a link couples a node pair and node is selected from the group consisting an access point device, datasink, routing sensor, and endpoint sensor;
  (iii) ranking the weighted links for each corresponding node pair in nondecreasing order of weight;
  (iv) selecting a next least weighted link and corresponding node pair as part of a subgraph;
  (v) repeating the selecting of the next least weighted link and corresponding node pair as part of the subgraph until every node is part of the subgraph and generates a spanning tree.

* * * * *